(No Model.)
H. D. R. GUMTOW & M. A. LUTZNER.
APPARATUS FOR MOISTENING AND COOLING AIR.
No. 395,896. Patented Jan. 8, 1889.
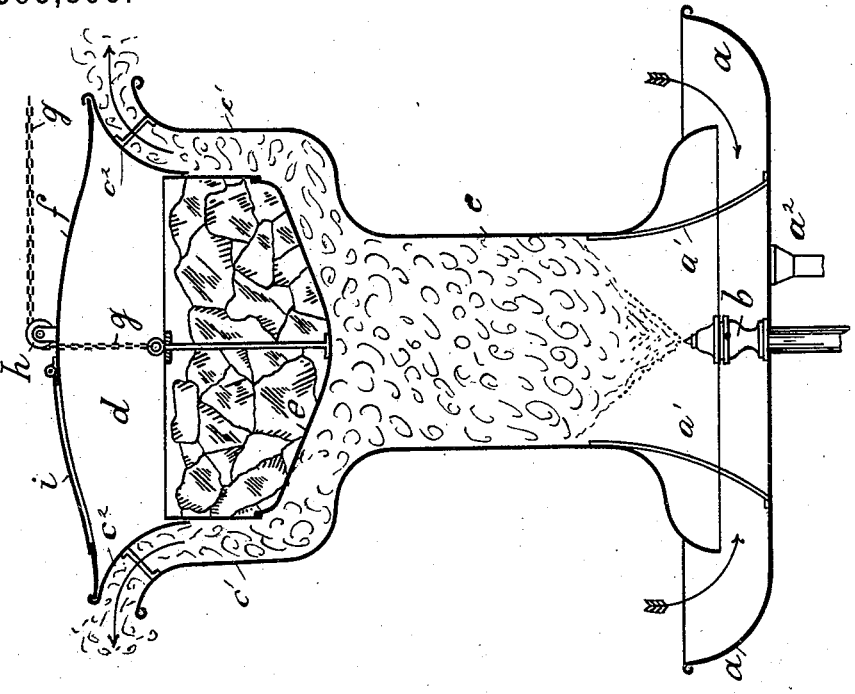
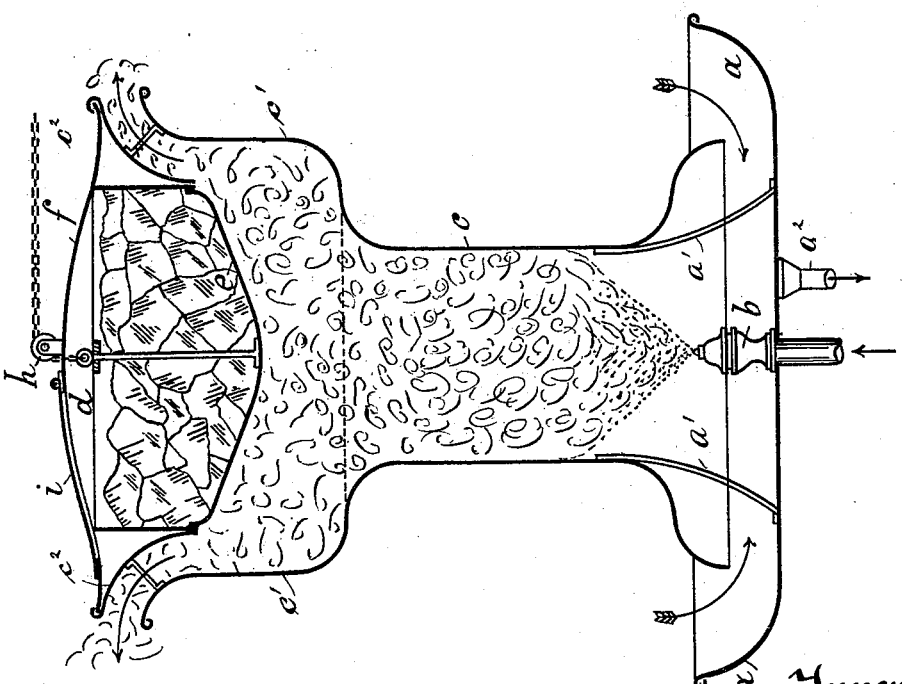

UNITED STATES PATENT OFFICE.

HERMANN DANIEL RUDOLPH GUMTOW, OF VIENNA, AUSTRIA-HUNGARY, AND MAXIMILIAN ALBERT LUTZNER, OF BERLIN, GERMANY.

APPARATUS FOR MOISTENING AND COOLING AIR.

SPECIFICATION forming part of Letters Patent No. 395,896, dated January 8, 1889.

Application filed July 7, 1888. Serial No. 279,327. (No model.)

*To all whom it may concern:*

Be it known that we, HERMANN DANIEL RUDOLPH GUMTOW, of Vienna, Austria-Hungary, and MAXIMILIAN ALBERT LUTZNER, of Berlin, Germany, have invented certain new and useful Improvements in Apparatus for Moistening and Cooling Air, of which the following is a specification.

The object of our invention is to provide a new and improved apparatus for moistening air and conducting the same into apartments; also, cooling said air and ventilating the apartments.

The invention consists in the construction and combination of parts and details, as will be fully set forth hereinafter, and pointed out in the claims.

In the accompanying drawings, Figure 1 is a vertical transverse sectional view of our improved adjustable apparatus for moistening and cooling air, the same being adjusted to subdivide the water into the most minute particles. Fig. 2 is a similar view showing it adjusted to produce coarser particles of water.

Similar letters of reference indicate corresponding parts.

From the center of the pan or bowl $a$ the nozzle $b$ projects upward, said nozzle being connected with a suitable water-conducting pipe. The nozzle is of such construction as to convert the water issuing from the same into fine spray or mist, which jet or stream of spray diverges upward and outward and by its suction draws upward a stream of air. The cylindrical shell $c$ is held above the nozzle $b$, and at its bottom is curved and flared outward and has its bottom edge a short distance above the pan or bowl $a$, and said shell is supported by bars $a'$ from the bowl or pan $a$.

$a^2$ is a drip-pipe for the water that collects in said pan or bowl. The upper part, $c'$, of the cylindrical shell is widened and flared upward and outward. A curved annular plate, $c^2$, is provided a short distance from the open end of the enlarged top part, $c'$, of the cylindrical shell, so as to form an annular outlet-opening at the top of said cylindrical shell, and on said curved plate $c^2$ the cover $f$ is secured. The annular curved plate $c^2$ surrounds the receptacle $d$, the bottom $e$ of which is beveled outward and upward from the center toward the rim. Said receptacle is suspended from the chain $g$, passed over a pulley, $h$, on the cover $f$. The cover $f$ is provided with a hinged door or gate, $i$, which can be opened when it is necessary to place ice into the receptacle $d$. The spray rises in the cylindrical shell $c$, strikes against the beveled bottom $e$ of the receptacle $d$, is deflected laterally, strikes against the sides of the enlarged part $c'$ of the cylindrical shell $c$, is deflected upward and strikes against the inner curved surface of the plate $c^2$, and is deflected upward and outward. As the spray strikes against the bottom of the receptacle $d$, the enlarged part $c'$, and the plate $c^2$, the coarser particles of water are separated from the spray and only the very fine spray or mist issues from the top opening. In case it is desired to cool the air and spray, ice can be placed into the receptacle $d$. In case a still greater separation of the coarse and fine particles of water in the spray is desired, the receptacle $d$ is lowered, as shown in Fig. 1, so that the spray comes in contact with a greater surface, and thus a greater percentage of the coarse particles of water is separated from the spray.

By means of the above-described apparatus all coarse particles of water can be separated from the spray to such an extent that only mist or vapor enters the compartments.

Having thus described our invention, we claim as new and desire to secure by Letters Patent—

1. In an air moistening and cooling apparatus, the combination, with an air-conductor, of a vertically-adjustable vessel in the outlet-opening of the conductor, said adjustable vessel having its bottom beveled from the center upward and outward, substantially as herein shown and described.

2. In an air moistening and cooling apparatus, the combination, with a casing or shell, of a vertically-adjustable receptacle in the upper part of the same, said receptacle having its under side beveled upward and outward, and a cover above said receptacle, the edge of said cover and the top edge of the shell forming an outlet-opening for the moistened air, substantially as herein shown and described.

In testimony whereof we have signed our names to this specification in the presence of two subscribing witnesses.

HERMANN DANIEL RUDOLPH GUMTOW.
MAXIMILIAN ALBERT LUTZNER.

Witnesses for Gumtow:
EDMUND JUSSEN,
OTTO SCHIFFEN.

Witnesses for Lutzner:
B. ROI,
F. VON VERSEN.